G. M. BEERBOWER.
FEED RACK.
APPLICATION FILED FEB. 8, 1911.

1,005,143.

Patented Oct. 10, 1911.

WITNESSES:
Ella M. Disosway.
Anna L. Mittelstadt.

INVENTOR:
George Marshall Beerbower

UNITED STATES PATENT OFFICE.

GEORGE MARSHALL BEERBOWER, OF NEW YORK, N. Y.

FEED-RACK.

1,005,143.  Specification of Letters Patent. Patented Oct. 10, 1911.

Application filed February 8, 1911. Serial No. 607,277.

*To all whom it may concern:*

Be it known that I, GEORGE MARSHALL BEERBOWER, residing at New York city, in the county and State of New York, and whose residence address is 768 East One Hundred and Eighty-seventh street, have invented new and useful Improvements in Feed-Racks, of which the following is a specification.

My invention relates to improvements in feed-racks in which hay or similar feed may be placed from which animals may eat and so arranged that the bulk of feed is clamped whereby an animal may separate a mouthful at a time without scattering a portion under his feet. Similar feed-racks are in use but so far as I am aware, they are arranged with backs which consist of frames made of angle-bar and covered with wire-netting. These backs are costly to make, and, since the frame presents horizontal ledges and the netting lies near to the wall to which it is attached, dirt, weed-seeds and trash collect upon this back which, moistened by the saliva of the animal, decays and provides lodging-places for vermin and presents an untidy appearance and unsanitary condition. Strong springs are usually provided to create a pressure of the front of the rack against the feed. These springs are costly and require a considerable force to overcome them in placing the rack in position for filling.

The objects of my improvement are, first to furnish a feed-rack at a reduced cost; second, to provide a feed-rack in which there may be no stationary horizontal planes or members in such relation as to accumulate dirt; and, third, to afford means of easy operation. I attain these ends by the mechanism illustrated in the accompanying drawing in which—

Figure 1:
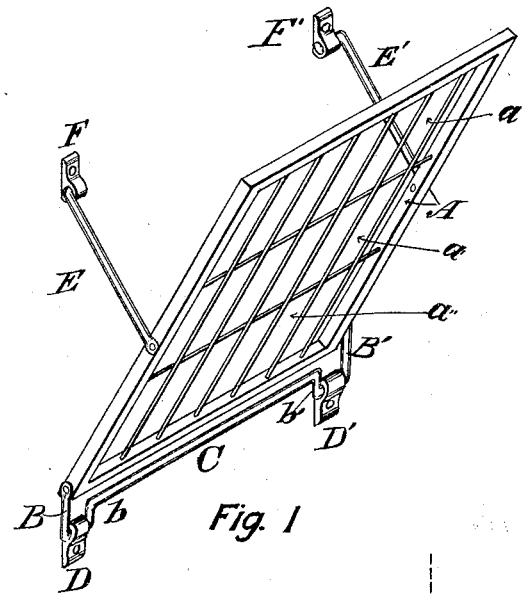
Figure 2:
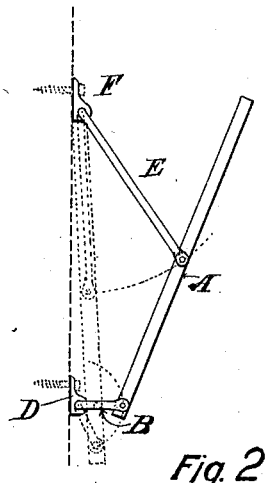

Figure 1, is a perspective view of my feed-rack, in position for putting in feed; Fig. 2, in solid lines, a side view in position for the animal to eat, and Fig. 2 in dotted lines, as closed when empty.

The various features of the device may be identified on the drawing by reference letters. The same letter is used for each part whenever it may appear in one or both drawings.

A is the front having apertures $a$ $a'$ $a''$ through which feed may be drawn by an animal. The lower edge of this front A is pivotally attached to the cranks B B' which are rigidly attached to the shaft C. The shaft C has off-sets $b$ $b'$ and between crank B and off-set $b$ is supported in a bearing D; and between crank B' and off-set $b'$ is supported by the bearing D'. Near the center of each lateral edge of the front A is pivotally attached one end of the connecting-bar E E' the other end being carried by the bearing F F'. Bearings D D' and F F' are provided with holes for convenience in attaching directly to the wall of an animal-stall, by means of screws.

It may be observed that the only stationary members are the bearings, D D' F F' and these have their upper surfaces inclined at a steep angle from horizontal, so that dirt is prevented from lodging, by gravity. All other members of the feed-rack are rotated or turned to inclined positions once in each charging of the feed-rack so that dirt which might accumulate will be dislodged by gravity. In the application of the device, the bearings D D' F F' are rigidly attached to a wall of the animal-stall. The front is raised bodily until it stands in the position shown in Fig. 1, with its lower edge against the wall and its upper edge extended far away from the wall, forming a V-shaped hopper into which feed may easily be placed.

After depositing the desired amount of feed behind the front, the lower edge is pulled outwardly. The weight of the front being guided by the cranks B B' and the connecting rods E E' tends to swing the front against the feed and grasp it so that mouthfuls may readily be detached through the openings $a$ $a'$ $a''$, etc., of the front A, and as rapidly as the bulk of feed behind the front is reduced, the front continues to recede, remaining at all times against the feed and grasping it until all is removed and then the various members assume the position indicated in dotted lines in Fig. 2. The purpose of the off-sets $b$ $b'$ is to swing the shaft C away from the wall during the time the shaft is turning, to release any trash which might collect on the shaft while near the wall.

Having described my improvements, what I regard as new and useful and desire to secure by Letters Patent of the United States is set forth in the following claims:

1. In a feed-rack, the combination with a front which is provided with apertures suitable for an animal to extract feed through, of one or more cranks pivotally attached to said front and rigidly attached to a rotatable shaft, and one or more connecting members of greater length than said cranks, having one end pivotally connected to said front and the other end supported in a bearing; said bearing being adapted to being attached to a wall, substantially as shown and described.

2. In a feed-rack, the combination with a movable front adapted to hold fodder, arranged so that an animal may extract the fodder through the same in small portions, of two or more cranks rigidly attached to a shaft having off-sets, and one or more connecting-bars of greater length than said cranks, one end of said connecting-bar being connected to said front and the other end supported in a bearing, said bearing being adapted to being attached to a wall, substantially as shown and for the purpose set forth.

3. The combination, in a feed-rack, with a movable front having apertures through which small portions of feed may be withdrawn by an animal, of two or more pivotally attached connecting members of differing lengths, adapted to swing the upper edge of said front outwardly, and the lower edge inwardly at the same time, as and for the purpose set forth.

4. A feed-rack comprising a movable front in which apertures are provided through which feed may be extracted by an animal, a pair of cranks pivotally attached to said front and rigidly attached to a shaft; said shaft supported by bearings adapted to be attached to a wall, one or more connecting members pivotally connecting said front to one or more bearings, adapted to be attached to a wall, substantially as shown and described.

GEORGE MARSHALL BEERBOWER.

Witnesses:
ELLA M. DISOSWAY,
ANNA L. MITTELSTADT.

Copies of this patent may be obtained for five cents each, by addressing the "Commissioner of Patents, Washington, D. C."